(12) United States Patent
Dash et al.

(10) Patent No.: US 12,457,230 B2
(45) Date of Patent: Oct. 28, 2025

(54) INTELLIGENT HYBRID CLOUD ORCHESTRATION ENGINE LEVERAGING 3 LAYERED SECURED DATA GATEWAY

(71) Applicant: Bank of America Corporation, Charlotte, NC (US)

(72) Inventors: Bikash Dash, Hyderabad (IN); Meera Lakshmi, Tamilnadu (IN)

(73) Assignee: Bank of America Corporation, Charlotte, NC (US)

(*) Notice: Subject to any disclaimer, the term of this patent is extended or adjusted under 35 U.S.C. 154(b) by 246 days.

(21) Appl. No.: 18/198,388

(22) Filed: May 17, 2023

(65) Prior Publication Data

US 2024/0388592 A1    Nov. 21, 2024

(51) Int. Cl.
*G06F 21/00* (2013.01)
*H04L 9/06* (2006.01)
*H04L 9/32* (2006.01)
*H04L 9/40* (2022.01)

(52) U.S. Cl.
CPC ........ *H04L 63/1425* (2013.01); *H04L 9/0631* (2013.01); *H04L 9/3242* (2013.01)

(58) Field of Classification Search
CPC .. H04L 63/1425; H04L 9/0631; H04L 9/3242
See application file for complete search history.

(56) References Cited

U.S. PATENT DOCUMENTS

| | | |
|---|---|---|
| 8,806,489 B2 | 8/2014 | Freimuth et al. |
| 9,122,745 B2 | 9/2015 | Akolkar et al. |
| 9,590,917 B2 | 3/2017 | Karunamoorthy et al. |
| 10,244,070 B2 | 3/2019 | Swain et al. |
| 10,467,527 B1 | 11/2019 | Margaglia et al. |
| 10,779,339 B2 | 9/2020 | Verkaik et al. |
| 10,977,140 B2 | 4/2021 | Hu et al. |
| 11,409,901 B2 * | 8/2022 | T .......................... H04L 63/061 |
| 11,500,566 B2 | 11/2022 | Naik et al. |
| 11,521,276 B2 | 12/2022 | Kraemer et al. |
| 11,757,914 B1 * | 9/2023 | Jakobsson ............... H04L 51/42 726/25 |
| 2017/0063785 A1 | 3/2017 | Durniak et al. |
| 2017/0083910 A1 | 3/2017 | Kraemer et al. |
| 2020/0076578 A1 * | 3/2020 | Ithal .................... H04L 63/0272 |

(Continued)

FOREIGN PATENT DOCUMENTS

| | | |
|---|---|---|
| CN | 114327285 A | 4/2022 |
| WO | 2021055179 A1 | 3/2021 |
| WO | 2022271523 A1 | 12/2022 |

*Primary Examiner* — Michael M Lee
(74) *Attorney, Agent, or Firm* — Banner & Witcoff, Ltd.

(57) ABSTRACT

A hybrid cloud orchestration process to move data from a private to a public cloud is disclosed. Requested data in a private cloud is analyzed to determine risk levels and whether it is fit for transfer based on an initial threat analysis. Data is encrypted by AES or RSA depending on data sensitivity. Redundant data and embedded threats are removed from the encrypted data without decryption. Encrypted data is hashed. Hash keys and hashed data are stored in a DHT distributed across nodes. Data requests from applications in the public cloud are validated by matching the request key with the unique hash key in the individual node containing the corresponding hash data. Data is returned to the application in the public cloud through an encrypted tunnel.

19 Claims, 8 Drawing Sheets

(56) References Cited

U.S. PATENT DOCUMENTS

| | | |
|---|---|---|
| 2020/0401935 A1 | 12/2020 | Malhotra et al. |
| 2021/0026808 A1 | 1/2021 | Zhao et al. |
| 2022/0094739 A1 | 3/2022 | Vestemean |
| 2022/0182217 A1* | 6/2022 | Jaquette ............. H04L 63/0428 |
| 2022/0262522 A1 | 8/2022 | Goldstein |
| 2022/0374540 A1* | 11/2022 | Parks .................... G06F 21/602 |
| 2022/0407707 A1 | 12/2022 | Gaur et al. |
| 2023/0161906 A1* | 5/2023 | Brannon ............. G06F 21/6245 717/101 |

* cited by examiner

INTELLIGENT HYBRID CLOUD ORCHESTRATION ENGINE LEVERAGING 3 LAYERED SECURED DATA GATEWAY

TECHNICAL FIELD

The present disclosure relates to information security systems and, more particularly, to systems, methods, and apparatus for fast and secure data transfer in hybrid cloud systems from private clouds to public clouds.

DESCRIPTION OF THE RELATED ART

Hybrid clouds include applications, or their components such as computing, networking, and data storage, when deployed across public and private clouds. On-premises servers are also often referred to as private clouds.

In hybrid clouds, which combine public and private clouds with on-premises data centers and other "edge" locations, applications are executed using a combination of processing, storage, and services from these many environments. Many businesses employ hybrid cloud computing strategies since they do not rely just on one public cloud.

By allowing customers to move workloads between cloud environments and manage them, hybrid cloud solutions let users build more flexible systems that are tailored to their unique business requirements. Many businesses decide to use hybrid cloud systems to cut expenses, reduce risk, and adhere to legal obligations.

In existing hybrid clouds, data is securely stored on the private cloud, whereas the public cloud is used for running applications dependent on the data. Data movement between private and public clouds is currently performed using conventional wireless network technology and the like. In current data movement lifecycles from private to public clouds, there are security risks and data loss issues.

SUMMARY OF THE INVENTION

In accordance with one or more arrangements of the non-limiting sample disclosures contained herein, solutions are provided to address one or more of the shortcomings in the field of hybrid clouds by, inter alia: (a) implementing an intelligent, hybrid-cloud, orchestration engine/process that utilizes a three-layered secure data gateway; (b) combining "cognitive bulk data analysis using Spectral Clustering Algorithm (SCA)" and "user and entity behavior analytics" (UEBA) to determine whether individual data or data elements are authorized or otherwise "fit" for data transfer; (c) performing auto data analysis to determine data sensitivity and moving qualified data in a speed-optimized manner depending on the associated risk level using Advanced Encryption Standard (AES) for more sensitive data and Rivest-Shamir-Adleman (RSA) for less sensitive data in order to optimize speed transfer and resource requirements based on data sensitivity; (d) performing identifying and eliminating threats during data in motion without decrypting the data using convolution neural network-long short-term memory (CNN-LSTM) algorithm; and (e) utilizing distributed hash tables (DHTs) to provide enhanced data availability in a secure manner.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a hybrid cloud orchestration process can comprise one or more steps, such as, for example: retrieving, by a first security module, data elements from data in a private cloud; analyzing, the data elements by the first security module, to determine risk levels; determining, by the first security module, whether the data elements qualify for transfer based on an initial threat analysis; encrypting, into encrypted data by the first security module, based on the risk levels, the data elements that qualified for transfer; removing, from the encrypted data by a second security module, any redundant data; analyzing, by the second security module, the encrypted data to identify threats; removing, from the encrypted data by the second security module, the threats; hashing, by a cryptographic hash function in a third security module, the encrypted data into hash keys and hashed data; storing, by the third security module, the hash keys and the hashed data in a distributed hash table (DHT); receiving, by the third security module from an application in a public cloud, data requests for the hashed data, said data requests including request keys; validating, by the third security module, the data requests by comparing the request keys with the hash keys; and/or transferring, from the third security module to the application in the public cloud, the hashed data if the request keys match the hash keys.

In some arrangements, a hybrid cloud orchestration process can comprise one or more steps, such as, for example: storing, in a private cloud, critical data; retrieving, by a first security layer in a gateway, data elements from the critical data; cognitively analyzing, the data elements by the first security layer using a spectral clustering algorithm (SCA), to determine risk levels; determining, by the first security layer using user and entity behavior analytics (UEBA), whether the data elements qualify for transfer based on an initial threat analysis; encrypting, into encrypted data by the first security layer using AES or RSA encryption, based on the risk levels, the data elements that qualified for transfer based on the initial threat analysis; removing, from the encrypted data by a second security layer in the gateway, any redundant data; detecting, by the second security layer in the encrypted data, threats by analyzing the encrypted data with a convolution neural network-long/short-term memory (CNN-LSTM) algorithm; removing, by the CNN-LSTM in the second security layer, the threats in the encrypted data; hashing, the encrypted data by a SHA-256 cryptographic hash function in a third security layer in the gateway, into hash keys and corresponding hashed data; storing, by the third security layer, the hash keys and the hashed data in nodes in a distributed hash table (DHT); receiving, from an application in a public cloud, data requests for the hashed data, said data requests including request keys; locating, by the third security layer, the nodes with the hash keys corresponding to the request keys; validating, by the third security layer, the data requests by comparing the request keys with the hash keys; retrieving, by the third security layer from the nodes, the hashed data if the request keys match the hash keys; and/or transferring, from the third security layer to the application in the public cloud through an encrypted tunnel, the hashed data if the request keys match the hash keys. In some arrangements, a hybrid cloud orchestration process can comprise one or more steps such as, for example: storing, in a private cloud, critical data; retrieving, by a first security layer in a gateway, data elements from the critical data; cognitively analyzing, the data elements by the first security layer using a spectral clustering algorithm (SCA), to determine risk levels; determining, by the first security layer using user and entity behavior analytics (UEBA), whether the data elements qualify for transfer based on an initial threat analysis; encrypting, into encrypted data by the first security layer using AES or RSA encryption in order to optimize speed, based on the risk levels, the data elements that qualified for transfer based on the initial threat analysis; removing, from the encrypted data by a second security layer in the gateway, any redundant data; detecting, by the second security layer in the encrypted data, threats by analyzing the encrypted data with a convolution neural network-long/short-term memory (CNN-LSTM) algorithm; removing, by the CNN-LSTM in the second security layer, the threats in the encrypted data without decrypting the encrypted data; hashing, the encrypted data by a SHA-256 cryptographic hash function in a third security layer in the gateway, into hash keys and corresponding hashed data, each of said hash keys being unique and corresponding to a datum of said hashed data, said hashed data being unrestricted in size; storing, by the third security layer, the hash keys and the hashed data in nodes in a decentralized distributed hash table (DHT), each of said nodes being directly connected to all others of said nodes; receiving, from an application in a public cloud, data requests for the hashed data, said data requests including request keys; locating, by the third security layer, the nodes with the hash keys corresponding to the request keys; validating, by the third security layer, the data requests by comparing the request keys with the hash keys; retrieving, by the third security layer from the nodes, the hashed data if the request keys match the hash keys; and/or transferring, from the third security layer to the application in the public cloud through an encrypted tunnel, the hashed data if the request keys match the hash keys.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
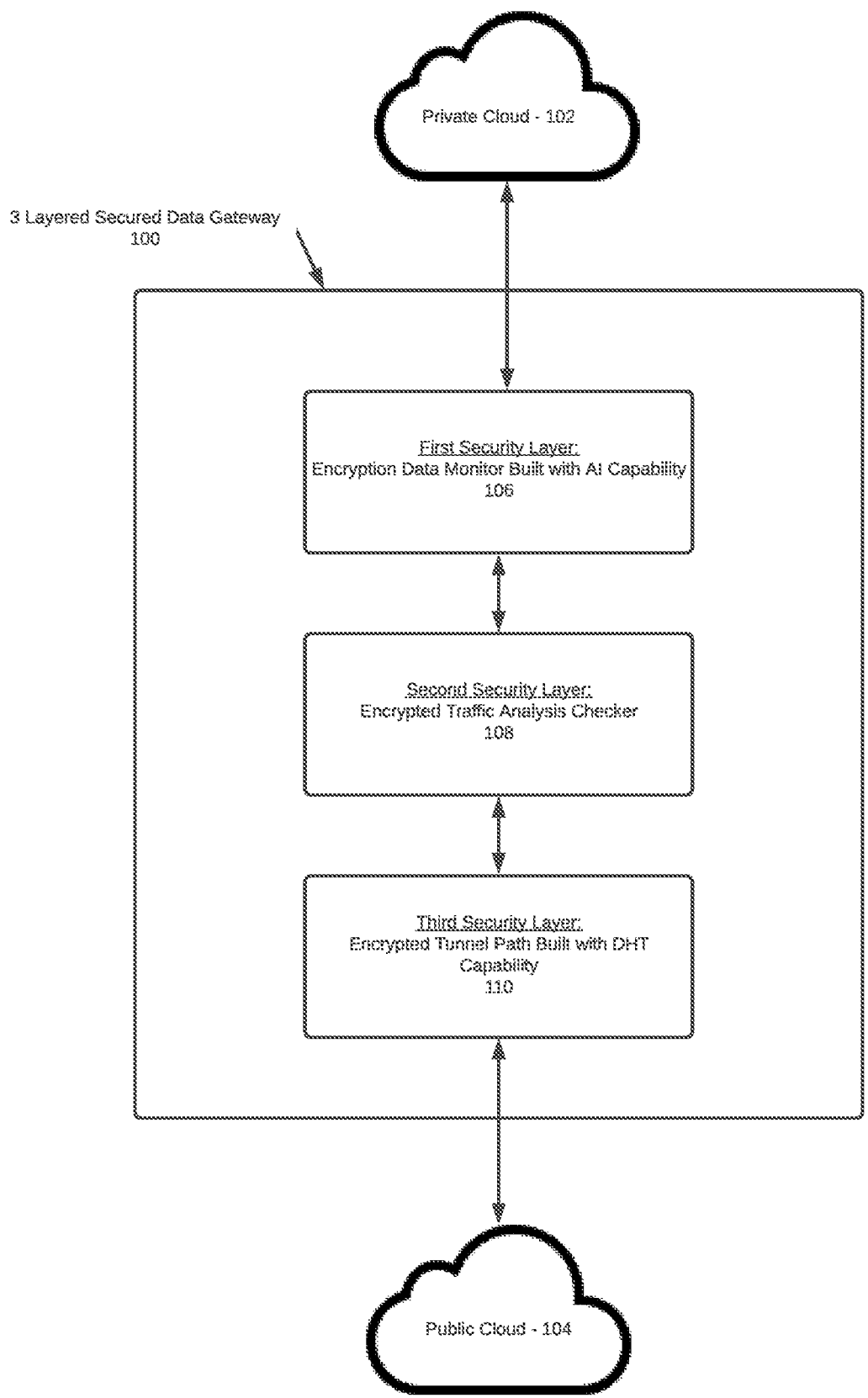
FIG. 1 depicts an intelligent hybrid-cloud orchestration engine that leverages a three (3) layered, secured, data gateway in accordance with one or more information-security aspects of this disclosure as they relate to on-demand (or other) transfers from private clouds to requesting applications in public clouds.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting disclosure, FIG. 1 depicts an intelligent hybrid-cloud orchestration engine that leverages a three (3) layered, secured, data gateway in accordance with one or more information-security aspects of this disclosure as they relate to on-demand (or other) transfers from private clouds to requesting applications in public clouds.

A three (3) layered secured data gateway 100 is utilized to transfer data from a private cloud 102 to a public cloud 100. Typically, an application in the public cloud will make a request for secure data in the private cloud 102. That request will be communicated to the gateway 100, which will then pull data from the private cloud and initiate an analysis of it to determine which, if any, elements of the data are suitable for transfer. Some data may be prohibited from disclosure to or storage in a public cloud due to regulatory, heightened security requirements for the type of data, business practices, etc.

Data retrieved from private cloud 102 is first processed, inter alia, by a first security layer 106, which includes an encryption data monitor built with AI capability. Appropriate data is then encrypted and provided to a second security layer that, inter alia, analyzes and checks the encrypted traffic and makes necessary modifications. Resulting encrypted data is then provided to a third security layer 110, which stores the data using distributed hash table (DHT) technology and ultimately provides appropriate data through an encrypted tunnel path built with the DHT capability to the public cloud 104.

Figure 2:
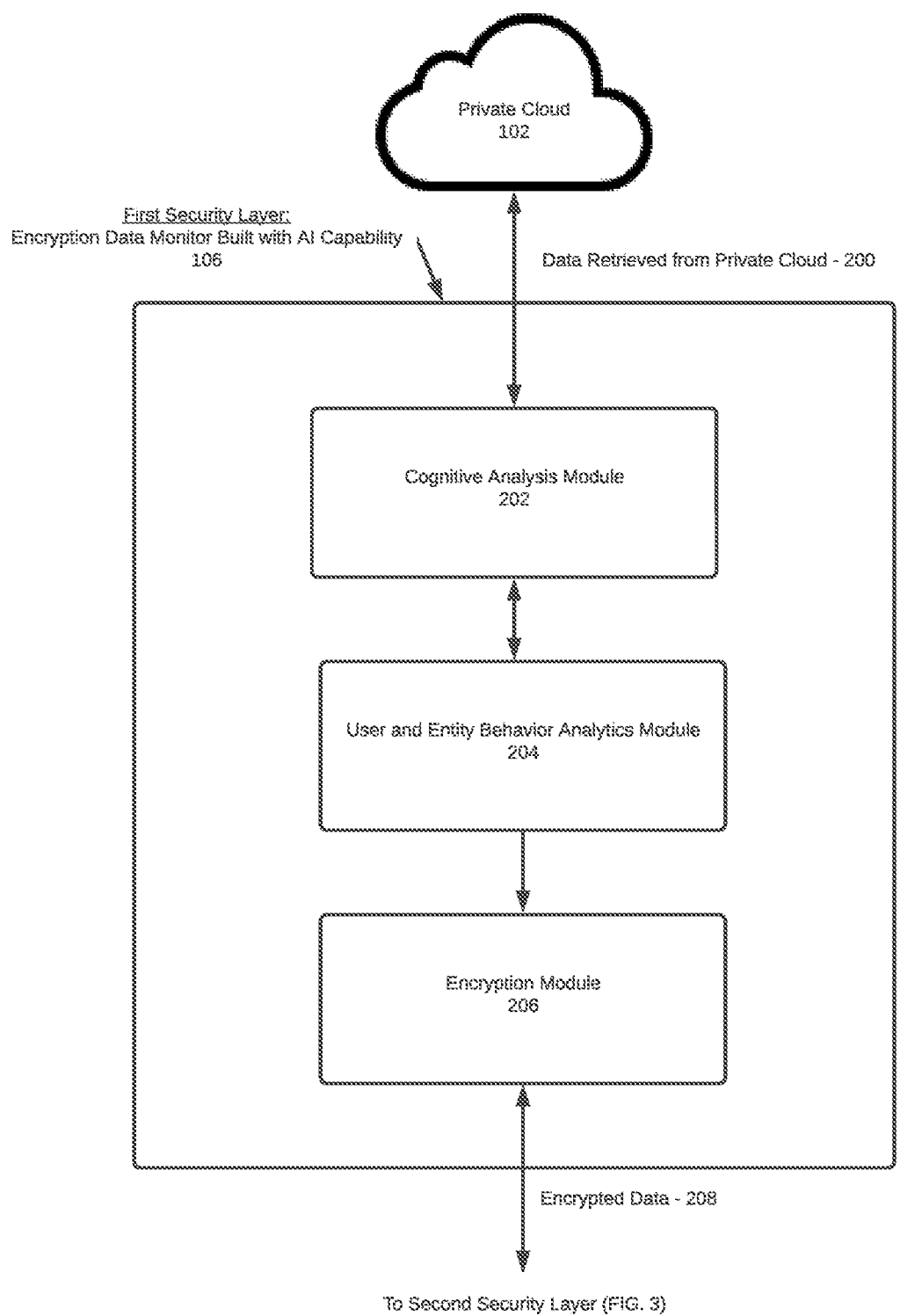
FIG. 2 depicts modules that can be utilized in a first security layer (e.g., encryption data monitor built with AI capability) of a gateway in a hybrid-cloud orchestration engine in accordance with one or more information-security aspects of this disclosure as they relate to on-demand (or other) transfers from private clouds to requesting applications in public clouds.

By way of non-limiting disclosure, FIG. 2 depicts modules that can be utilized in a first security layer 106 (e.g., encryption data monitor built with AI capability) of a gateway in a hybrid-cloud orchestration engine in accordance with one or more information-security aspects of this disclosure as they relate to on-demand (or other) transfers from private clouds to requesting applications in public clouds.

Critical data elements are stored in the private cloud 102 that are sent through the security layer checks as the need arises to transmit data to the public cloud 104. The first security layer 106 is an encryption data monitor built with AI capability.

On the bulk data need for a time period in public cloud, this layer cognitively analyzes the data and determines the risk level associated with each of them in aspects of data use, type of data, data dependency and additional attributes by using an algorithm such as, for example, the Spectral Clustering Algorithm (SCA). This functionality is implemented in cognitive analysis module 202.

In module 204, classification and determination of corresponding risk levels along with outcomes of initial threat analyses are performed using User and Entity Behavior Analytics (UEBA)-ML-based technology). This is utilized to determine if data is fit for transfer and what level of encryption is needed.

In encryption module 206, data is encrypted by Advanced Encryption Standard (AES) and Rivest-Shamir-Adleman (RSA) AI algorithms based on the classification and associated risk level(s). This makes the data ready for orchestration between cloud environments and pushes data into the second security layer. AES encryption is more secure than RSA encryption; however, AES encryption/decryption is more time consuming and resource intensive. Hence, preferably only more sensitive data that requires a higher level of encryption is encrypted using AES and less sensitive data can be more quickly and efficiently encrypted using RSA.

Figure 3:
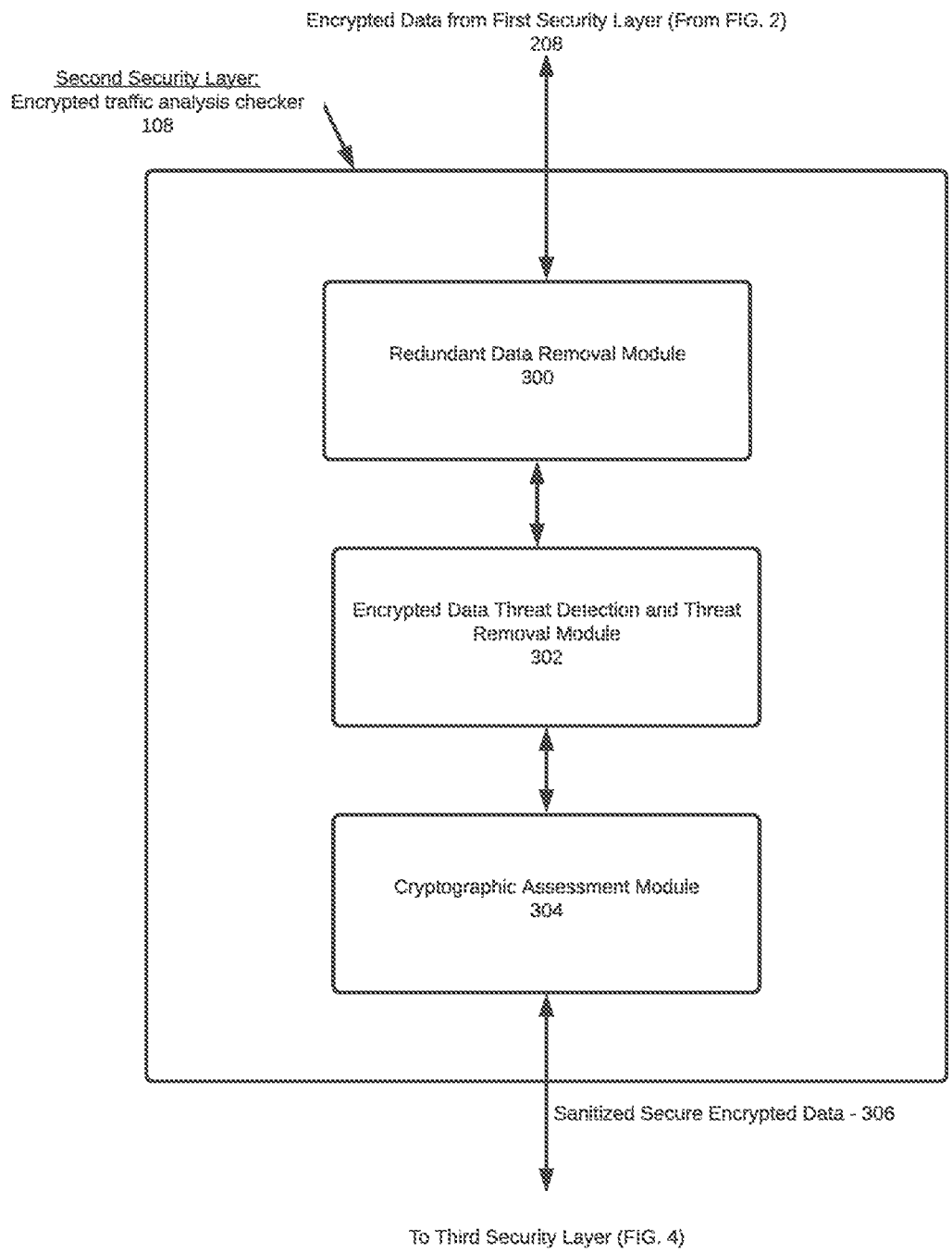
FIG. 3 depicts modules that can be utilized in a second security layer (e.g., encrypted traffic analysis checker) of a gateway in a hybrid-cloud orchestration engine in accordance with one or more information-security aspects of this disclosure as they relate to on-demand (or other) transfers from private clouds to requesting applications in public clouds.

By way of non-limiting disclosure, FIG. 3 depicts modules that can be utilized in a second security layer 108 (e.g., encrypted traffic analysis checker) of a gateway in a hybrid-cloud orchestration engine in accordance with one or more information-security aspects of this disclosure as they relate to on-demand (or other) transfers from private clouds to requesting applications in public clouds.

The second security layer 108 makes the encrypted data ready by removing threats and redundant data before channelizing to next layer. Redundant data is removed by redundant data removal module 300. In the encrypted data threat detection and threat removal module 302, threats in the encrypted data are determined, without the need for decryption, through the analysis of data traffic of encrypted data that is achieved by a convolution neural network-long short-term memory (CNN-LSTM) algorithm, which also performs cryptographic assessment of secured network sessions in the cryptographic assessment module 304. Sanitized secure encrypted data or traffic 306 can then be passed to the third security level.

Figure 4:
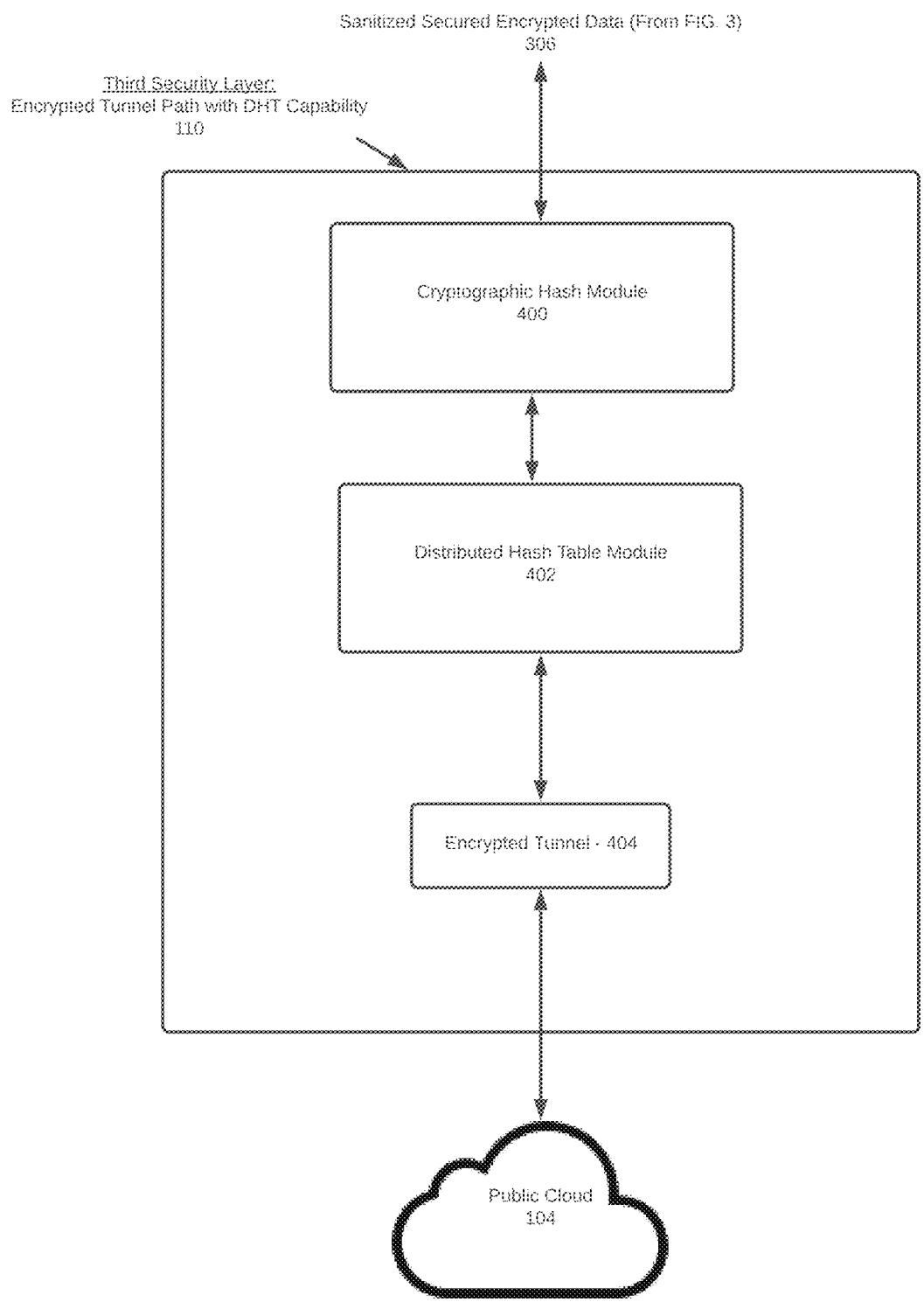
FIG. 4 depicts modules that can be utilized in a third security layer (e.g., encrypted tunnel path with DHT capability) of a gateway in a hybrid-cloud orchestration engine in accordance with one or more information-security aspects of this disclosure as they relate to on-demand (or other) transfers from private clouds to requesting applications in public clouds.

By way of non-limiting disclosure, FIG. 4 depicts modules that can be utilized in a third security layer 110 (e.g., encrypted tunnel path with DHT capability) of a gateway in a hybrid-cloud orchestration engine in accordance with one or more information-security aspects of this disclosure as they relate to on-demand (or other) transfers from private clouds to requesting applications in public clouds.

Sanitized secure encrypted data or traffic 306 is received by the third security layer 110 and provided to the cryptographic hash module 400. Keys for the encrypted data are hashed by a cryptographic hash function algorithm (e.g., SHA-256) and sent to a DHT layer 402. Each unique hash key is available for the public cloud to use to request a corresponding unique data element. After validation, hashed data requested by the public cloud 104 is provided thereto through an encrypted tunnel 404.

Figure 5:
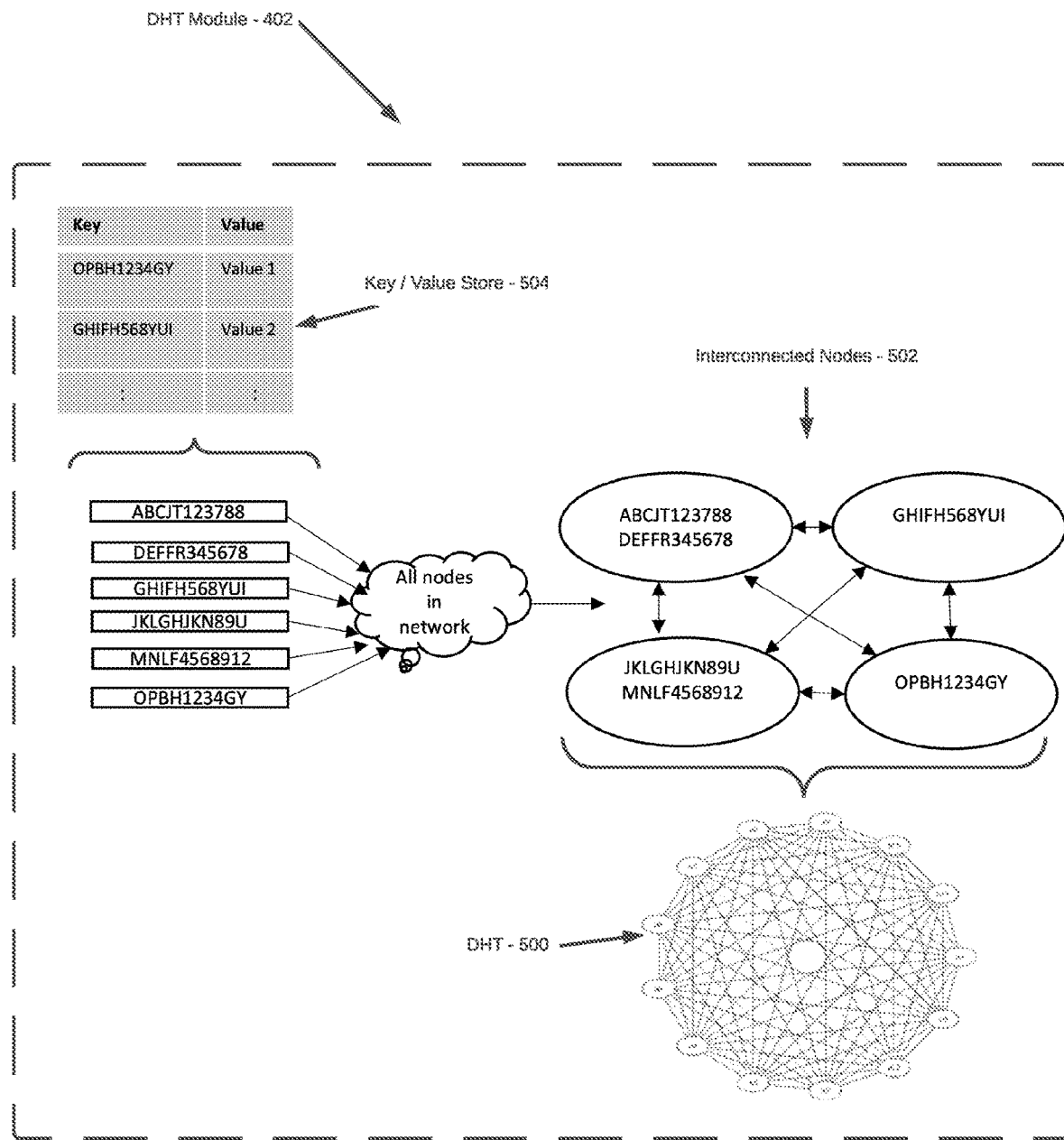
FIG. 5 depicts a sample DHT module (in the third security layer) in accordance with one or more information-security aspects of this disclosure as they relate to on-demand (or other) transfers from private clouds to requesting applications in public clouds.

By way of non-limiting disclosure, FIG. 5 depicts a sample DHT module 402 (in the third security layer 110) in accordance with one or more information-security aspects of this disclosure as they relate to on-demand (or other) transfers from private clouds to requesting applications in public clouds. This figure provides more details regarding the encryption, DHT functionality, node distribution, encrypted tunnel path, etc.

A distributed hash table (DHT) 500 is comprised of many individual nodes 502. As illustrated in the future, each node is directly with each other node in order to allow fast identification and matching of hash keys for requested hash data. By using an overlay network wherein neighboring nodes are connected, nodes are able to find any given hash key in the key-space. Each node will contain a unique hash key and a corresponding hash value. This is illustrated in the key/value store 504.

Hash keys for data can be validated by a Message Digest (MD5) hashing algorithm in the DHT 500. Upon a key's successful match with its corresponding node in DHT which holds the hashed key which is matched by traversing through its overlay network.

Once the node with hash key is identified, control is passed to the key/value store. The key/value store in each node in the DHT contains the hashed key and all required data to make it available in the public cloud.

The encrypted tunnel path built with DHT capability to securely transmit requested data to the public cloud provides an extra layer of security protection by shielding the needed sensitive data after secure provision of it to the DHT layer. This allies with the public cloud to make the sensitive data available based on the need using the capabilities of a DHT in a key/value mechanism. Once fetched from the DHT and received through the encryption tunnel at the public cloud, all required data is decrypted using the hash key to run applications in the public cloud.

Figure 6:
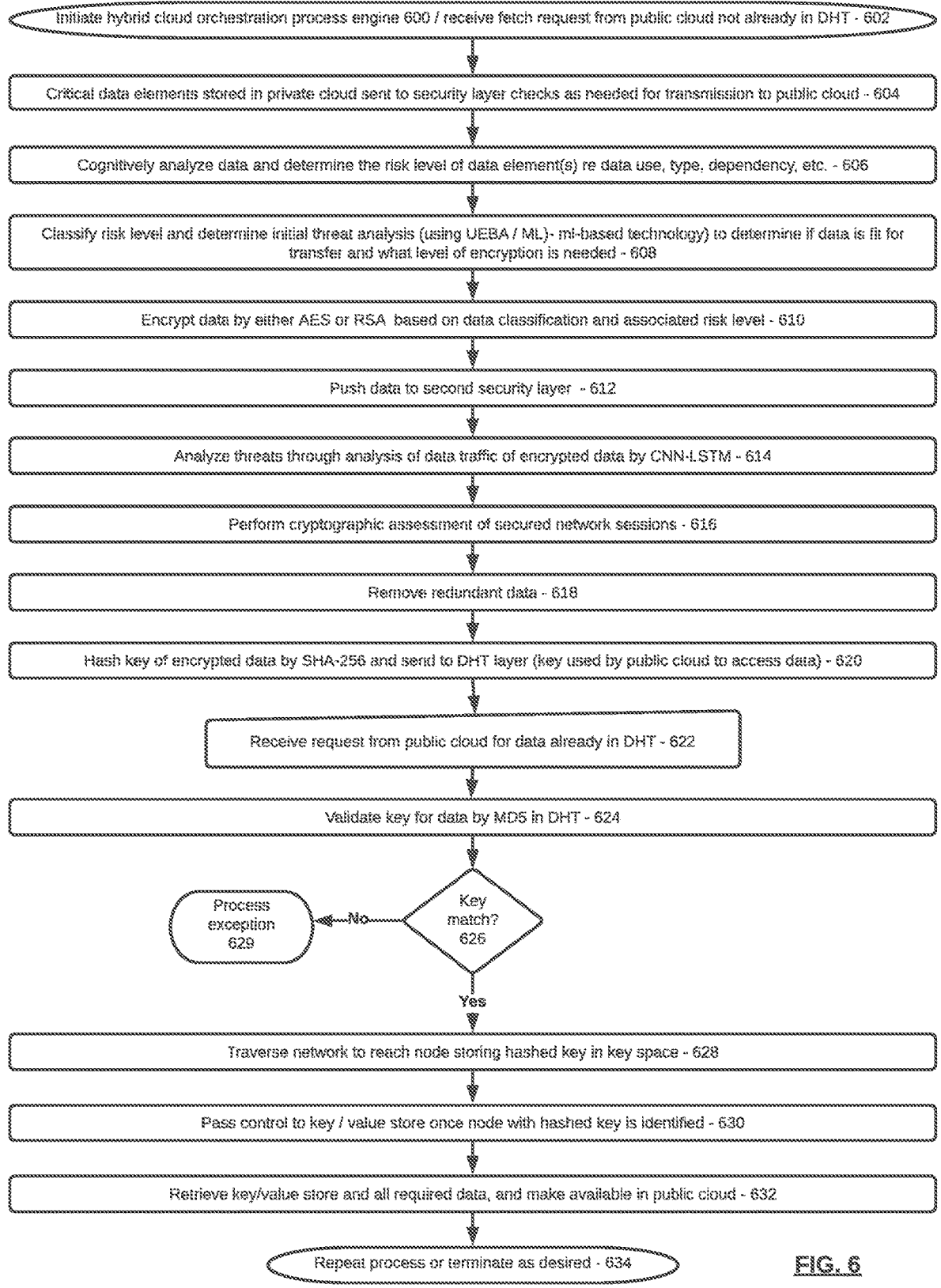
FIG. 6 depicts a functional, flow diagram showing sample interactions, interfaces, steps, functions, and components in accordance with one or more information-security aspects of this disclosure as they relate to on-demand (or other) transfers from private clouds to requesting applications in public clouds.

By way of non-limiting disclosure, FIG. 6 depicts a functional, flow diagram showing sample interactions, interfaces, steps, functions, and components in accordance with one or more information-security aspects of this disclosure as they relate to on-demand (or other) transfers from private clouds to requesting applications in public clouds.

A hybrid cloud orchestration process engine is initiated 600 and fetch requests are received from a public cloud for data not already in a DHT 602. Critical data elements stored in private cloud are sent to security layer checks as needed for transmission to public cloud 604. A cognitively analysis of data is performed, and a determination is made regarding the risk level of data element(s) based on data use, type, dependency, etc. 606. In 608, risk level(s) are classified and initial threat analyses (using UEBA/ML) determine if data is fit for transfer and what level of encryption is needed. Data is encrypted by either AES or RSA based on data classification and associated risk level in 610. Data is pushed to the second security layer in 612.

In 614, threats are identified by analysis of data traffic of encrypted data by a CNN-LSTM algorithm. This threat identification can be performed "on the fly" without decrypting the traffic. Cryptographic assessment of secured network sessions is performed in 616. Redundant data is removed in 618. In step 620, hash keys of encrypted data are generated by a SHA-256 algorithm and send to the DHT layer, wherein the hash key used by public cloud to access data and by the DHT layer to store key/values in nodes.

When a request is received from a public cloud for data already in the DHT in 622, the key is validated by MD5 in the DHT in 624. If there is a key match 626, the network is traversed to reach the node stored the hashed key in the key space in 628. Otherwise, a process exception can occur in 629.

Upon validation and location of the node in the DHT, control is passed to the key/value store based on the identified hash key in 630. The applicable portion of the key/value store and all required data to make it available in the public cloud is retrieved in 632. The value or data stored in the store can be of any type and of unlimited size. The process can then be repeated for subsequent data requests or terminated as desired in 634.

Figure 7:
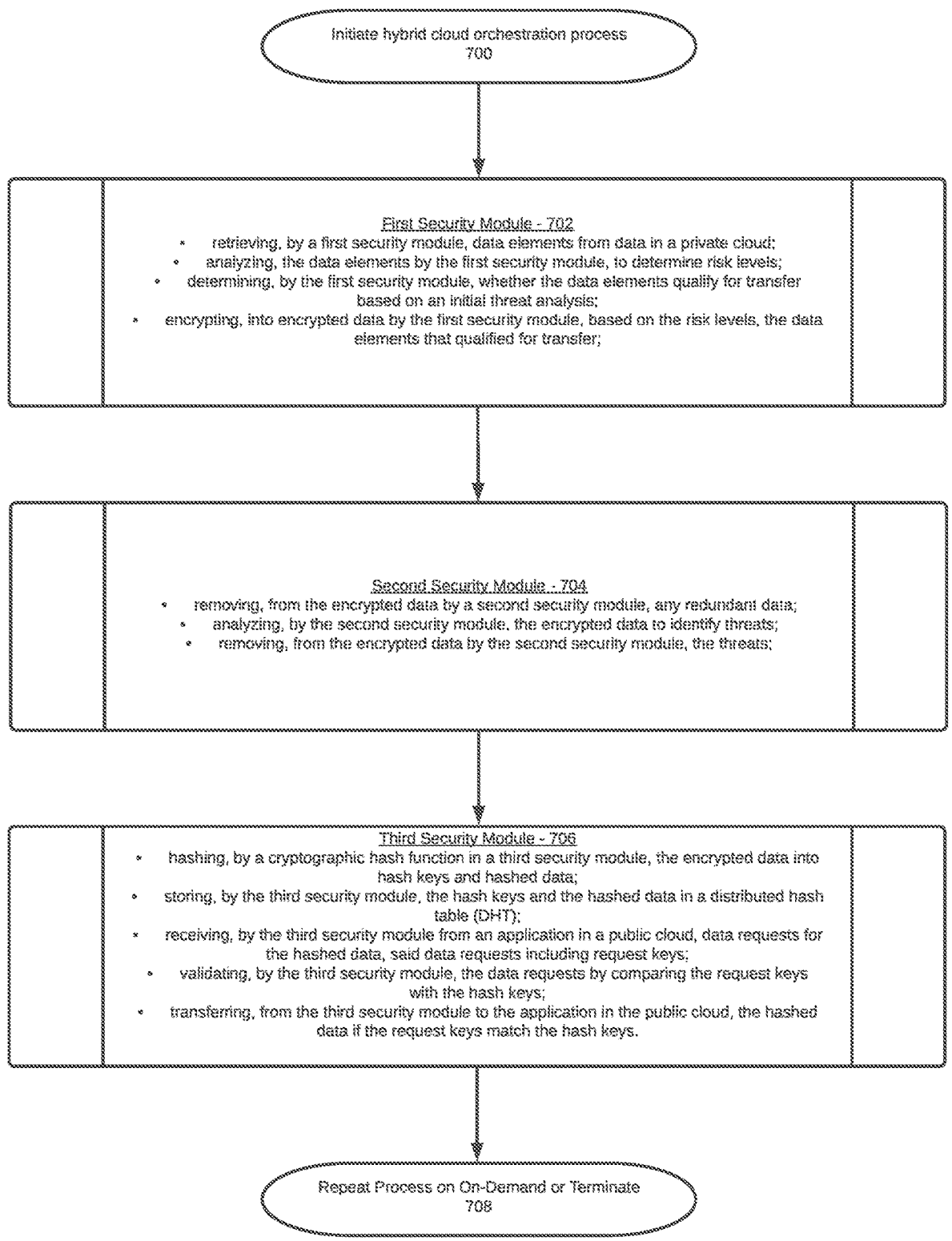
FIG. 7 depicts another functional, flow diagram showing sample interactions, interfaces, steps, functions, and components in accordance with one or more information-security aspects of this disclosure as they relate to on-demand (or other) transfers from private clouds to requesting applications in public clouds.

By way of non-limiting disclosure, FIG. 7 depicts another functional, flow diagram showing sample interactions, interfaces, steps, functions, and components in accordance with one or more information-security aspects of this disclosure as they relate to on-demand (or other) transfers from private clouds to requesting applications in public clouds.

In step 700, a hybrid cloud orchestration process engine is initiated. In the processes for the first security module 702, steps may be performed such as: retrieving, by a first security module, data elements from data in a private cloud; analyzing, the data elements by the first security module, to determine risk level; determining, by the first security module, whether the data elements qualify for transfer based on an initial threat analysis; and encrypting, into encrypted data by the first security module, based on the risk levels, the data elements that qualified for transfer.

In the processes for the second security module 704, steps may be performed such as: removing, from the encrypted data by a second security module, any redundant data; analyzing, by the second security module, the encrypted data to identify threats; and removing, from the encrypted data by the second security module, the threats.

In the processes for the third security module 706, steps may be performed such as: hashing, by a cryptographic hash function in a third security module, the encrypted data into hash keys and hashed data; storing, by the third security module, the hash keys and the hashed data in a distributed hash table (DHT); receiving, by the third security module from an application in a public cloud, data requests for the hashed data, said data requests including request keys; validating, by the third security module, the data requests by comparing the request keys with the hash keys; and transferring, from the third security module to the application in the public cloud, the hashed data if the request keys match the hash keys. The process may be repeated on-demand or otherwise as desired, or may terminate in 708.

Figure 8:
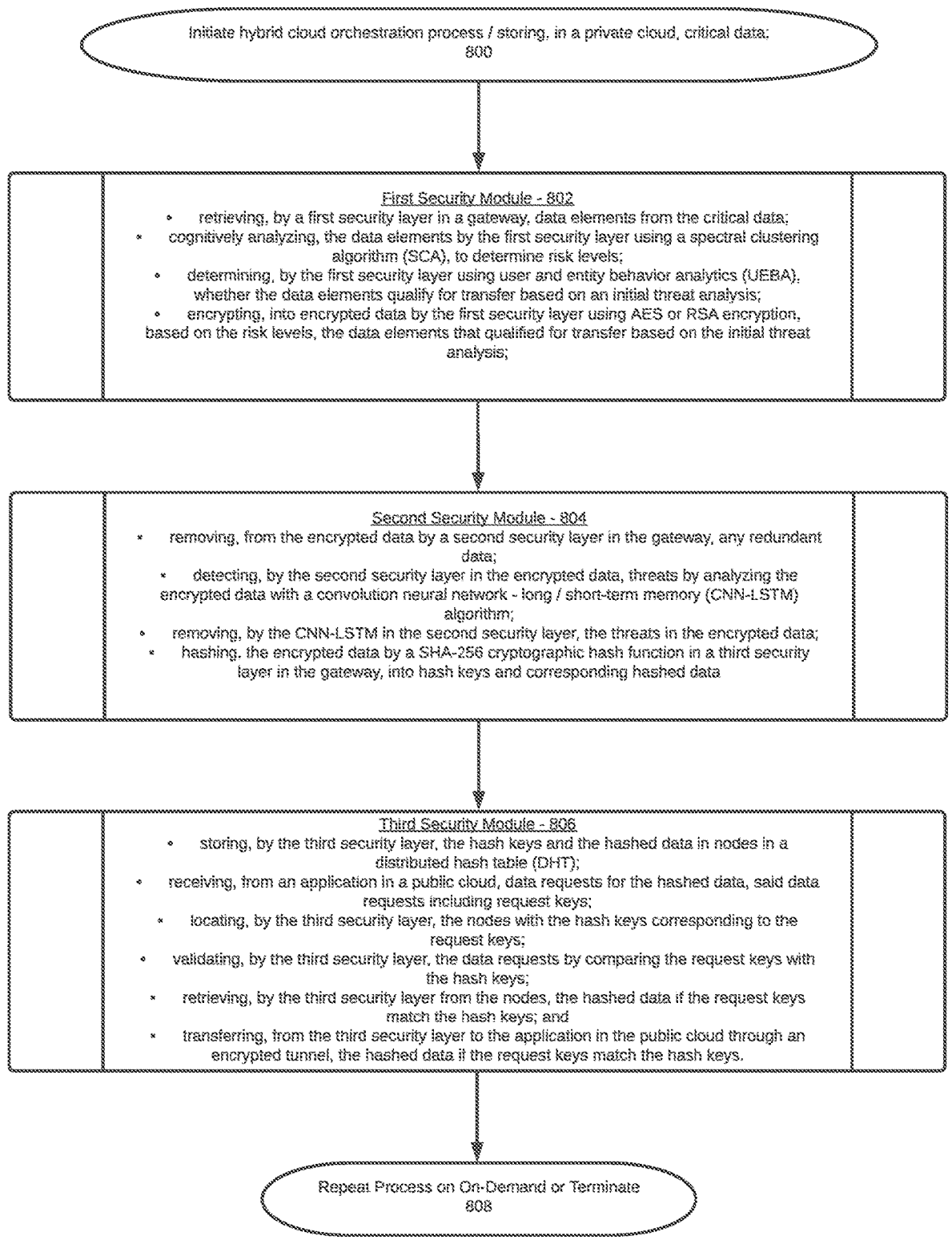
FIG. 8 depicts a further functional, flow diagram showing sample interactions, interfaces, steps, functions, and components in accordance with one or more information-security aspects of this disclosure as they relate to on-demand (or other) transfers from private clouds to requesting applications in public clouds.

By way of non-limiting disclosure, FIG. 8 depicts a further functional, flow diagram showing sample interactions, interfaces, steps, functions, and components in accordance with one or more information-security aspects of this disclosure as they relate to on-demand (or other) transfers from private clouds to requesting applications in public clouds.

In step 800, a hybrid cloud orchestration process engine is initiated. In the processes for the first security module 802, steps may be performed such as: retrieving, by a first security layer in a gateway, data elements from the critical data; cognitively analyzing, the data elements by the first security layer using a spectral clustering algorithm (SCA), to determine risk levels; determining, by the first security layer using user and entity behavior analytics (UEBA), whether the data elements qualify for transfer based on an initial threat analysis; and encrypting, into encrypted data by the first security layer using AES or RSA encryption, based on the risk levels, the data elements that qualified for transfer based on the initial threat analysis.

In the processes for the first security module 804, steps may be performed such as: removing, from the encrypted data by a second security layer in the gateway, any redundant data; detecting, by the second security layer in the encrypted data, threats by analyzing the encrypted data with a convolution neural network-long/short-term memory (CNN-LSTM) algorithm; removing, by the CNN-LSTM in the second security layer, the threats in the encrypted data; and hashing, the encrypted data by a SHA-256 cryptographic hash function in a third security layer in the gateway, into hash keys and corresponding hashed data.

In the processes for the second security module 804, steps may be performed such as: removing, from the encrypted data by a second security layer in the gateway, any redundant data; detecting, by the second security layer in the encrypted data, threats by analyzing the encrypted data with a convolution neural network-long/short-term memory (CNN-LSTM) algorithm; removing, by the CNN-LSTM in the second security layer, the threats in the encrypted data; and hashing, the encrypted data by a SHA-256 cryptographic hash function in a third security layer in the gateway, into hash keys and corresponding hashed data.

In the processes for the third security module 806, steps may be performed such as: storing, by the third security layer, the hash keys and the hashed data in nodes in a distributed hash table (DHT); receiving, from an application in a public cloud, data requests for the hashed data, said data requests including request keys; locating, by the third security layer, the nodes with the hash keys corresponding to the request keys; validating, by the third security layer, the data requests by comparing the request keys with the hash keys; retrieving, by the third security layer from the nodes, the hashed data if the request keys match the hash keys; and transferring, from the third security layer to the application in the public cloud through an encrypted tunnel, the hashed data if the request keys match the hash keys. The process may be repeated on-demand or otherwise as desired, or may terminate in 808.

Various arrangements in this disclosure provide unconventional combinations of 3 unique layers to identify the right data fit for movement with associated risk level, to provide highest level of appropriate speed and resource-optimized encryption, and eliminate threats and while leveraging DHT capability. The combination of "cognitive bulk data analysis using Spectral Clustering Algorithm (SCA)" and "User and Entity Behavior Analytics" is beneficial to determine whether data is fit for transfer. Data encryption of moving data depending on the associated risk level using Advanced Encryption Standard (AES) and Rivest-Shamir-Adleman (RSA) AI algorithms optimizes speed and resource consumption. Threat determination of data in motion using convolution neural network-long short-term memory (CNN-LSTM) algorithm is beneficial because it can be performed without decrypting the data. This increases speed and obviates potential security risks. The unconventional use of DHT technology provides enhanced data availability and security.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A hybrid cloud orchestration process comprising the steps of:

storing, in a private cloud, critical data;

retrieving, by a first security layer in a gateway, data elements from the critical data;

cognitively analyzing, the data elements by the first security layer using a spectral clustering algorithm (SCA), to determine risk levels associated with transferring the data elements to a public cloud based on data sensitivity and security threats;

determining, by the first security layer using user and entity behavior analytics (UEBA), whether the data elements qualify for transfer based on an initial threat analysis;

encrypting, into encrypted data by the first security layer using AES or RSA encryption, based on the risk levels, the data elements that qualified for transfer based on the initial threat analysis;

removing, from the encrypted data by a second security layer in the gateway, any redundant data;

detecting, by the second security layer, security threats in the encrypted data by analyzing the encrypted data with a convolution neural network-long/short-term memory (CNN-LSTM) algorithm without decrypting the encrypted data;

removing, by the CNN-LSTM in the second security layer, the detected security threats from the encrypted data;

hashing, the encrypted data by a SHA-256 cryptographic hash function in a third security layer in the gateway, into hash keys and corresponding hashed data;

storing, by the third security layer, the hash keys and the hashed data in nodes in a distributed hash table (DHT);

receiving, from an application in a public cloud, data requests for the hashed data, said data requests including request keys;

locating, by the third security layer, the nodes with the hash keys corresponding to the request keys;

validating, by the third security layer, the data requests by comparing the request keys with the hash keys;

retrieving, by the third security layer from the nodes, the hashed data if the request keys match the hash keys; and transferring, from the third security layer to the application in the public cloud through an encrypted tunnel, the hashed data if the request keys match the hash keys.

2. A hybrid cloud orchestration process comprising steps of:

retrieving, by a first security module, data elements from data in a private cloud;

analyzing, the data elements by the first security module, to determine risk levels;

determining, by the first security module, whether the data elements qualify for transfer based on an initial threat analysis;

encrypting, into encrypted data by the first security module, based on the risk levels, the data elements that qualified for transfer;

removing, from the encrypted data by a second security module, any redundant data;

analyzing, by the second security module, the encrypted data to identify security threats;

removing, from the encrypted data by the second security module, the security threats;

hashing, by a cryptographic hash function in a third security module, the encrypted data into hash keys and hashed data;

storing, by the third security module, the hash keys and the hashed data in a distributed hash table (DHT);

receiving, by the third security module from an application in a public cloud, data requests for the hashed data, said data requests including request keys;

validating, by the third security module, the data requests by comparing the request keys with the hash keys; and transferring, from the third security module to the application in the public cloud, the hashed data if the request keys match the hash keys, wherein the risk levels are determined cognitively by a spectral clustering algorithm (SCA).

3. The hybrid cloud orchestration process of claim 2 wherein user and entity behavior analytics (UEBA) are utilized to determine whether the data elements are exempt from transfer based on sensitivity of the data elements.

4. The hybrid cloud orchestration process of claim 2 wherein user and entity behavior analytics (UEBA) are utilized to determine whether the data elements are exempt from transfer based on legal restrictions.

5. The hybrid cloud orchestration process of claim 2 wherein the data elements are encrypted with at least two different encryption algorithms based on sensitivity of the data elements in order to optimize speed of encryption.

6. The hybrid cloud orchestration process of claim 5 wherein a first of said at least two different encryption algorithms is faster than a second of said at least two different encryption algorithms.

7. The hybrid cloud orchestration process of claim 6 wherein the first of said at least two different encryption algorithms is an advanced encryption standards (AES) algorithm.

8. The hybrid cloud orchestration process of claim 7 wherein the AES algorithm is used if the data elements exceed a sensitivity threshold.

9. The hybrid cloud orchestration process of claim 8 wherein the second of said at least two different encryption algorithms is a Rivest-Shamir-Adleman (RSA) algorithm.

10. The hybrid cloud orchestration process of claim 9 wherein the RSA algorithm is used if the data elements do not exceed the sensitivity threshold.

11. The hybrid cloud orchestration process of claim 10 wherein the security threats in the encrypted data are identified and removed by a convolution neural network-long/short-term memory (CNN-LSTM) algorithm.

12. The hybrid cloud orchestration process of claim 11 wherein the security threats are identified and removed without decrypting the encrypted data.

13. The hybrid cloud orchestration process of claim 12 wherein the cryptographic hash function is a SHA-256 algorithm.

14. The hybrid cloud orchestration process of claim 13 wherein the DHT is distributed across a plurality of nodes whereby said plurality of nodes are interconnected to expedite locating the hash keys corresponding to the request keys.

15. The hybrid cloud orchestration process of claim 14 wherein the hashed data is transferred from the DHT to the public cloud through an encrypted tunnel.

16. The hybrid cloud orchestration process of claim 15 wherein the hashed data is decrypted in the public cloud to be used by the application.

17. The hybrid cloud orchestration process of claim 16 wherein the hashed data in the plurality of nodes corresponding to the hash keys contain all required data to make the values available in the public cloud.

18. The hybrid cloud orchestration process of claim 16 wherein the plurality of nodes across which the DHT is distributed contain key/value stores that include the hash keys and all required data to make the values available in the public cloud.

19. A hybrid cloud orchestration process comprising the steps of:
    storing, in a private cloud, critical data;
    retrieving, by a first security layer in a gateway, data elements from the critical data;
    cognitively analyzing, the data elements by the first security layer using a spectral clustering algorithm (SCA), to determine risk levels associated with transferring the data elements to a public cloud based on data sensitivity and security threats;
    determining, by the first security layer using user and entity behavior analytics (UEBA), whether the data elements qualify for transfer based on an initial threat analysis;
    encrypting, into encrypted data by the first security layer using AES or RSA encryption in order to optimize speed, based on the risk levels, the data elements that qualified for transfer based on the initial threat analysis;
    removing, from the encrypted data by a second security layer in the gateway, any redundant data;
    detecting, by the second security layer, security threats in the encrypted data by analyzing the encrypted data with a convolution neural network-long/short-term memory (CNN-LSTM) algorithm without decrypting the encrypted data;
    removing, by the CNN-LSTM in the second security layer, the detected security threats from the encrypted data without decrypting the encrypted data;
    hashing, the encrypted data by a SHA-256 cryptographic hash function in a third security layer in the gateway, into hash keys and corresponding hashed data, each of said hash keys being unique and corresponding to a datum of said hashed data, said hashed data being unrestricted in size;
    storing, by the third security layer, the hash keys and the hashed data in nodes in a decentralized distributed hash table (DHT), each of said nodes being directly connected to all others of said nodes;
    receiving, from an application in a public cloud, data requests for the hashed data, said data requests including request keys;
    locating, by the third security layer, the nodes with the hash keys corresponding to the request keys;
    validating, by the third security layer, the data requests by comparing the request keys with the hash keys;
    retrieving, by the third security layer from the nodes, the hashed data if the request keys match the hash keys; and
    transferring, from the third security layer to the application in the public cloud through an encrypted tunnel, the hashed data if the request keys match the hash keys.

* * * * *